United States Patent [19]

O'Hara et al.

[11] 4,128,436

[45] Dec. 5, 1978

[54] RHEOLOGICAL AGENTS

[75] Inventors: Kevin J. O'Hara, Maidstone, England; Howard J. Kilvington, Rhiwbina, Wales

[73] Assignee: Coats Brothers & Company Ltd., London, England

[21] Appl. No.: 755,743

[22] Filed: Dec. 30, 1976

Related U.S. Application Data

[63] Continuation of Ser. No. 572,865, Apr. 29, 1975, abandoned.

[30] Foreign Application Priority Data

May 29, 1974 [GB] United Kingdom ............... 23700/74

[51] Int. Cl.$^2$ ....................... C08L 91/00; C09D 11/06
[52] U.S. Cl. .................................... 106/243; 106/252; 260/404.5; 260/18 N
[58] Field of Search .......................... 260/404.5, 18 N; 106/243, 252, 308 F

[56] References Cited

U.S. PATENT DOCUMENTS

| | | | |
|---|---|---|---|
| 3,252,820 | 5/1966 | Vignolo et al. | 106/272 |
| 3,819,386 | 6/1974 | Higgins et al. | 106/27 |
| 3,925,278 | 12/1975 | Murai et al. | 260/22 R |

FOREIGN PATENT DOCUMENTS 894805  4/1962  United Kingdom.

*Primary Examiner*—Theodore Morris
*Attorney, Agent, or Firm*—Marn & Jangarathis

[57] ABSTRACT

A rheological control agent comprises a particulate blend of hydrogenated castor oil and an oligomeric polyamide derived from hydroxystearic acid, one or more saturated aliphatic α - omega diprimary diamines containing 2, 4, 6, 8 or 10 carbon atoms and one or more saturated aliphatic α-omega dicarboxylic acids containing from 2 to 10 carbon atoms and/or hydrogenated dimer acids. The oligomeric amide is suitably derived from the reaction of the hydroxystearic acid, dicarboxylic acid and diamine in such proportions that for each mole of hydroxystearic acid there is present 0.05 − 0.5 moles of dicarboxylic acid and a quantity of diamine sufficient to provide from 0.8 to 1.15 amine groups for each carboxyl group in the acid mixture.

18 Claims, No Drawings

RHEOLOGICAL AGENTS

This is a continuation of application Ser. No. 572,865, filed Apr. 29, 1975, now abandoned.

This invention is concerned with improvements in and relating to rheological or flow control agents, i.e. additives which modify the flow properties of surface coatings such as paints, varnishes and printing inks, adhesives and laminating compositions.

The design and control of rheological properties is a most important aspect of the art of formulating surface coatings such as paints, varnishes, and printing inks. In particular, the formulator has resort to a number of devices for imparting and controlling specific patterns of non-Newtonian flow behaviour which may affect the behaviour of the surface coating before, during and after application. Means for imparting thixotropy or false-body in various degrees constitute one of the most important groups of such techniques. Thus it is well known that drying oils and alkyds (which are widely used surface coatings media) may be modified by reaction with polyamide resins to provide thixotropic media which, inter alia, minimise pigment settlement during storage, facilitate application by brushing, and reduce the tendency of the applied film to sag. Other means of achieving these or combinations of related effects comprise the use of the so-called flow control additives which are mixed or milled into the surface coating at a later stage of manufacture, for example after the varnish has been manufacturer, during pigmentation, or even after a paint has been pigmented. A well known example of such a flow-control additive is finely powdered hydrogenated castor oil. This has been used mainly in the so-called decorative paints in which the principal solvent is white spirit. A major disadvantage of this material is its restricted useful temperature range. Thus, in the manufacture of paints and the like it is not uncommon for them to be subjected to temperatures in excess of 60° C. as, for example, during the process of ball milling or high speed mixing. Under such conditions hydrogenated castor oil (HCO) tends to dissolve in the paint medium and to crystallise out on subsequent cooling. The crystals so deposited are much greater in size than the original micronised particles and are substantially ineffective as rheological control agents. The effect of the HCO is thus substantially reduced or even completely lost. A further disadvantage is that the crystals may be visible in the applied paint film giving rise to the defect known as seediness.

Industrial paints of the kind normally dried by stoving present a special problem because they normally contain relatively powerful solvents such as xylol. The flow control additives of the prior art are substantially ineffective in such systems. This is doubly unfortunate because there is a need to control the flow of the paint in the applied film during the actual stoving operation. Thus one wishes to avoid the tendency of the wet paint to run down vertical surfaces of the painted object which is a particularly severe problem during the stoving operation because of the reduction in viscosity caused by the elevated temperature. The flow control additives of the prior art completely fail to do this at the typical stoving temperatures of about 120° C.

It has now been found, in accordance with the present invention, that an improved rheological agent (e.g. one which may be used at elevated temperature) may be obtained by modifying HCO by blending it with certain oligomeric amides and using the blend, in finely divided form, as a paint additive. This is surprising since HCO alone is intolerant of elevated temperatures whilst the oligomeric amides alone are substantially ineffective as flow control agents. Decorative paints dissolved in white spirit and like substantially aliphatic solvents may be modified in such a way that rheological control is exercised and seeding is avoided when the paint has been subjected to temperatures substantially higher than those which could safely be used with HCO. It is further possible to modify industrial paints containing powerful solvents such as xylol to such a degree that flow control during stoving operations, typically at 100°–120° C. is achieved.

The oligomeric amides used in the agent of the invention are those prepared by reaction of hydroxystearic acid with one or more saturated aliphatic alpha-omega diprimary diamines containing 2,4,6,8 or 10 carbon atoms together with one or more saturated aliphatic alpha-omega dicarboxylic acids containing 2 – 12 carbon atoms and/or hydrogenated dimer acids, (i.e. acids obtained by the hydrogenation of the acids obtained by the thermal dimerisation of unsaturated fatty acids). A preferred group of such acids comprises those containing 2, 4, 6, 8 or 10 or 12 carbon atoms.

According to the invention, therefore, there is provided a rheological or flow control agent comprising a blend in particulate form of hydrogenated castor oil and an oligomeric amide derived from hydroxystearic acid, one or more saturated aliphatic alpha-omega diprimary diamines containing 2, 4, 6, 8 or 10 carbon atoms and one or more saturated aliphatic alpha-omega dicarboxylic acids containing from 2 to 12 carbon atoms and/or hydrogenated dimer acids.

The oligomeric amides are prepared by reacting the components together in known manner, typically by heating under conditions of distillation of the evolved water at temperature of about 200° C.

Proportions of reactants are such that for each mole of hydroxystearic acid there is present 0.05 to 0.5 moles of dicarboxylic acid and a quantity of diamine such as to provide 0.8 to 1.15 amine groups for each carboxyl group present in the acid mixture. It is preferred to use 0.95 to 1.05 amine groups per carboxyl group since unreacted carboxyl or amine groups tend to diminish the flow-control properties of our products.

It is not necessary for the hydroxystearic acid to be of high purity: the crude material produced, for example, by the hydrolysis of HCO may be used, and this is a considerable economic advantage. It is to be understood that functional derivatives of the reactants, capable of reacting form the oligomeric amides may be used in place of the acids and amines themselves. For example, the methyl esters may be used in place of the acids, when the by-product of the reaction will be methanol instead of water.

The oligomeric amides are blended with HCO by melting together in a weight ratio 9:1 to 1:9, preferably 4:1 to 1:4, the mixed melt is cooled and allowed to solidify, and the powdered blend is finely powdered by means, for example, of a fluid energy mill or microniser. The powdered blend preferably has an average particle size of less than 25 microns and most preferably not more than 20% by weight of the powder, particularly not more than 10% by weight of the powder has a particle size above 25 microns.

The rheological control agents of the invention may be used in a very wide variety of surface coating compositions, e.g. paints, varnishes, printing inks, adhesives and laminating agents, based on a wide variety of resin systems such as acrylic resins, alkyd and modified alkyd resins, oleoresins, epoxy resins, polyester resins and chlorinated rubbers. The surface coating composition will normally also contain a solvent for the resin component, e.g. an aliphatic or aromatic hydrocarbon such as white spirit, solvent naptha or xylene, an aliphatic alcohol or ether such as butanol or a "Cellosolve" or ester thereof; or a phenol. It is not necessary however that the coating system contains a solvent and thus, for example, the surface coating composition may be of the solventless type, e.g. an epoxy resin/polyamide solventless coating composition or an unsaturated polyester based laminating composition.

The finely powdered blend is incorporated in the surface coating composition in a known manner. A convenient procedure consists in first preparing an approximate 15% w/w dispersion of the powdered additive in an organic medium miscible with the surface coating medium to be modified. In the case of a decorative paint this will normally be white spirit. Dispersion of the additive in the organic medium is effected by high speed stirring, during which a temperature of about 35° C. will typically be attained, and allowing the dispersion to cool overnight. This dispersion is then added to the paint mill-base prior to grinding and the manufacture of the paint is completed in the conventional manner.

The quantity of additive used depends on the precise composition of the additive, the degree of flow control desired and the conditions under which it is to be operative. For the flow control of decorative paints a typical concentration of solid additive would be about 0.5% calculated on the resin content of the paint.

Optimum selection of additive and of additive content may be carried out by simple routine tests well known in the art. A typical procedure applicable to decorative paints will first be described.

The basis of the tests may be a simple white paint pigmented with titanium dioxide at a pigment:binder ratio of 0.75:1. A suitable grade of titanium dioxide is Tioxide R-CR2 (Tioxide is a Registered Trade Mark). A suitable binder is a long oil linseed alkyd such as Synolac 50W (Synolac is a Registered Trade Mark). The solvent is white spirit, and 0.5% lead and 0.05% cobalt, calculated on alkyd solids, are incorporated in the form of their naphthenates as driers.

The pigment and an equal weight of medium are incorporated to provide what is known in the art as the mill base. To this is added a quantity of the 15% dispersion of the flow control additive such as to provide an additive concentration of, say, 0.5% on the total alkyd resin solids of the finished paint. This mixture is ground on a single roll mill to a Hegmann (fineness of grind) gauge reading of 8+, blended with the remaining medium and adjusted to a viscosity of 4 poises at 25° C. and 2500 sec$^{-1}$ by addition of white spirit.

This procedure may be repeated at different concentrations of additive and with different additives to find the optimum formulation appropriate to a particular paint composition under given conditions.

The paints may be tested after they have been heated to different temperatures, e.g. 40°, 80°, 120°, and subsequently allowed to cool to room temperature for 24 hours, by being drawn down using a Hegmann gauge to evaluate seediness. A Hegmann reading below 6 indicates seeding at a deleterious level. Flow control in terms of sag resistance may conveniently be assessed by means of the well-known dye-line sag test. In this the paint is sheared for about 5 minutes in a laboratory mixer to break down its structure and then quickly applied to a 12" × 4" glass plate carrying on its surface a line of white spirit soluble dye parallel to the short side. The paint is applied as a wedge film of wet thickness 0.002" to 0.006" by means of a wedge applicator and the plate is then stood vertically. Any sagging of the paint is indicated by a downward movement of the dye-line. An arbitrary measure of sag resistance may be taken as the film thickness at which a sag of 3mm below the original dye-line is observed. (The higher the figure, the greater the sag-resistance).

The adaption of the foregoing test procedure to industrial stoving paints will be obvious to those skilled in the art. However, in these systems the dye-line sag resistance test is less satisfactory because the powerful solvents present tend to cause blurring of the dye-line. A more satisfactory test, readily applicable to the assessment of behaviour in the stoving oven, is the following.

The substrate is a steel panel 12" × 4" with a line of $\frac{1}{4}$" diameter holes, 1" apart, drilled parallel to and 1" from one of the long edges. With the panel in a horizontal position, a wedge film of paint is applied, by spraying, ranging from 40 to 100 microns dry film thickness across the panel. The panel is then rapidly placed in the stoving oven in an upright position with the row of holes uppermost. When stoving is complete sags or tears of varying length, increasing with film thickness, depend from the holes. An arbitrary measure of sagging in the stove may be taken as the film thickness measured in microns just below a 1 cm. sag. A high figure denotes good sag resistance.

A typical paint system appropriate to this test procedure and used in our evaluations is based on titanium dioxide ("Runa RH472"), a plasticising alkyd resin ("Synolac 123X") and a butylated melamine formaldehyde resin ("Beetle BE615"). The solids ratio of alkyd to melamine resin is 70:30 and the pigment: binder ratio is 0.8:1.

Again it is convenient to prepare a 15% dispersion of the flow control additive but, with a paint solvent system largely composed of xylol, xylol is used to prepare the dispersion. Addition is again conveniently made to the mill base before grinding, grinding is to a Hegmann gauge reading of 8+ but final thinning is to a viscosity of 3 poises at 25° C. 2500 sec$^{-1}$ using a xylolbutanol mixture corresponding approximately to the solvent composition in the resin mixture. In the presence of such relatively powerful solvents, and for flow control at the temperatures encountered in stoving, higher levels of additive are normally required and 1-4% by weight calculated on the resin solids content of the paint is typical.

In order that the invention may be well understood the following preparations and Examples are given by way of illustration only.

PREPARATIONS 1-15.

The oligomeric amides detailed in Table 1 were all prepared by heating 1 mole of hydroxystearic acid with the designated dicarboxylic acid and diamine in the molar proportions stated, at 200° C. under conditions of distillation of the liberated water for about 4 hours or until the reaction was substantially complete as indicated by measurement of acid value.

| Oligomeric amide No. | Dicarboxylic acid | Dicarboxylic acid moles | Diamine | Diamine moles |
| --- | --- | --- | --- | --- |
| 1 | Sebacic | 0.1 | Ethylene diamine | 0.6 |
| 2 | Sebacic | 0.25 | Ethylene diamine | 0.75 |
| 3 | Adipic | 0.25 | Ethylene diamine | 0.75 |
| 4 | Suberic | 0.25 | Ethylene diamine | 0.75 |
| 5 | Sebacic | 0.5 | Ethylene diamine | 1.0 |
| 6 | Sebacic | 0.1 | Hexamethylene diamine | 0.6 |
| 7 | Oxalic | 0.5 | Ethylene diamine | 0.75 |
| 8 | Azelaic | 0.5 | Ethylene diamine | 1.0 |
| 9 | Succinic | 0.1 | Ethylene diamine | 0.6 |
| 10 | Hydrogenated dimer | 0.1 | Ethylene diamine | 0.6 |
| 11 | Hydrogenated dimer | 0.25 | Ethylene diamine | 0.75 |
| 12 | Dodecane dioic | 0.05 | Ethylene diamine | 0.55 |
| 13 | Dodecane dioic | 0.5 | Ethylene diamine | 1.0 |
| 14 | Sebacic | 0.1 | 1,4 Diamino butane | 0.6 |
| 15 | Glutaric | 0.1 | Ethylene diamine | 0.6 |

EXAMPLES 1-15 OLIGOMERIC AMIDE - HCO BLENDS.

The oligomeric amides and HCO in the stated proportions were heated together until just molten and well mixed. The melt was allowed to cool and solidify. The solidified mixture was broken up in a mortar and then comminuted by treatment in a laboratory grinder. The grinding was less efficient than that which can be obtained in a microniser and the flow-control effectiveness of the products was therefore below optimum. Even so, the products were found to be superior to the micronised flow-control additives of the prior art (see following sections).

Typical blends are listed in Table 2.

| Blend No. | Oligomeric amide No. | Oligomeric amide wt. % | HCO wt. % | Capillary mp of blend °C. |
| --- | --- | --- | --- | --- |
| 1 | 1 | 35 | 65 | 120-130 |
| 2 | 2 | 35 | 65 | 170-190 |
| 3 | 3 | 35 | 65 | 160-195 |
| 4 | 4 | 35 | 65 | 165-215 |
| 5 | 9 | 35 | 65 | 123-130 |
| 6 | 15 | 35 | 65 | 125-143 |
| 7 | 10 | 35 | 65 | 112-125 |
| 8 | 12 | 35 | 65 | 125-135 |
| 9 | 13 | 35 | 65 | 205-235 |
| 10 | 14 | 35 | 65 | 160-175 |
| 11 | 1 | 10 | 90 | 114-170 |
| 12 | 1 | 25 | 75 | 128-170 |
| 13 | 1 | 35 | 65 | 158-170 |
| 14 | 1 | 60 | 40 | 158-170 |
| 15 | 6 | 35 | 65 | 143-155 |

Effect of temperature on the dyeline sag resistance of decorative paints modified with (flow control additives of the invention)

The simple Tioxide R-CR2/Synolac 50W paint described above was prepared using different powdered blends as flow control additive at the level of 0.5% on alkyd solids. After manufacture the paints were heated to various temperatures to simulate various degrees of overheating and allowed to mature at room temperature for 24 hours before testing for sag resistance by the dye-line method described. Results in Table 4 are given as wet film thickness in thousands of an inch at which a 3 mm sag occurred.

| Blend 20-heating) | Condition sag after heating to | | | |
| --- | --- | --- | --- | --- |
| | Room temp. 20-22° C. (no heating) | 40° C | 80° C | 120° C |
| 1 | 2.5 | 3.2 | 3.5 | 2.7 |
| 2 | 3.0 | 3.7 | 4.3 | 3.0 |
| 3 | 2.5 | 3.0 | 4.9 | 5.9 |
| 4 | 2.5 | 3.0 | 3.5 | 4.9 |
| 5 | 2.5 | 2.9 | 2.9 | 3.3 |
| 6 | 3.0 | 3.4 | 3.1 | 3.7 |
| 7 | 2.5 | 2.5 | 2.9 | 2.8 |
| 8 | 2.6 | 2.5 | 2.8 | 2.5 |
| 9 | 2.5 | 2.8 | 3.2 | 3.7 |
| 10 | 2.5 | 2.5 | 5.8 | 5.8 |
| 11 | 2.5 | 3.4 | 6.0 | 6.0 |
| 12 | 2.6 | 3.5 | 6.0 | 6.0 |
| 13 | 2.8 | 3.5 | 4.5 | 5.0 |
| 14 | 3.0 | 4.0 | 3.3 | 3.7 |
| 15 | 2.8 | 3.5 | 3.5 | 4.5 |
| Control A | 3.0 | 3.5 | 3.0 | 2.5 |
| Control B | 2.5 | 3.0 | 4.4 | 2.6 |
| Control C | 2.5 | 2.5 | 2.5 | 2.5 |

Control A was HCO, micronised
Control B was a commercial product according to U.S. Patent No. 3,203,820 micronised
Control C was the original paint without flow control additive.

Effect of temperature on seeding of decorative paints modified with (flow control additives of the invention).

The paints were prepared, heated and matured as described above. They were then drawn down on a Hegmann gauge. Readings of 8 or higher (that of the original paint) were recorded as "smooth", 6-8 as "slightly seedy", below 6 as "seedy". Occasionally the action of the drawdown blade caused a further film defect: the paint film was disrupted and became discontinuous. In such cases the result "broken film" is recorded.

TABLE 5.

| Blend No. | Condition of film on Hegmann drawdown after heating to | | | |
| --- | --- | --- | --- | --- |
| | Room temp. 20-22° C (no heating) | 40° C | 80° C | 120° C |
| 1 | Smooth | Smooth | Smooth | Smooth |
| 2 | Smooth | Smooth | Smooth | Smooth |
| 3 | Smooth | Smooth | Smooth | Smooth |
| 4 | Smooth | Smooth | Smooth | Smooth |
| 5 | Smooth | Smooth | Smooth | Broken film. |
| 6 | Smooth | Smooth | Smooth | Smooth |
| 7 | Smooth | Smooth | Sl.seedy | Sl.seedy |
| 8 | Smooth | Smooth | Smooth | Sl.seedy |
| 9 | Smooth | Smooth | Smooth | Smooth |
| 10 | Smooth | Smooth | Smooth | Smooth |
| 11 | Smooth | Smooth | Smooth | Broken film |
| 12 | Smooth | Smooth | Smooth | Smooth |
| 13 | Smooth | Smooth | Smooth | Smooth |
| 14 | Smooth | Smooth | Smooth | Broken film |
| 15 | Smooth | Smooth | Smooth | Smooth |
| Control A | Smooth | Smooth | Seedy | Seedy |
| Control B | Smooth | Smooth | Broken film | Seedy |
| Control C | Smooth | Smooth | Smooth | Smooth |

Use of a typical additive in an industrial stoving paint.

The paint was prepared by the procedure described according to the following formulation (parts by weight).

| | |
|---|---|
| Titanium dioxide (Runa RH472) | 26.60 |
| Plasticising alkyd in xylol (Synolac 123) | 46.65 |
| Butylated melamine-formaldehyde resin in n-butanol (Beetle 615) | 16.60 |
| 15% dispersion of additive (Blend No. 2) | 2.20 |
| Xylol | 4.75 |
| n-butanol | 3.20 |

This was thinned to a viscosity of 3 poises at 25° C. 2500 sec$^{-1}$ using a mixture of 3 pbw xylol and 1 pbw n-butanol. The level of additive employed was 1% w/w on resin solids.

Seeding tests were carried out in the aforesaid manner against Control D and Control E with the following results. (Control D contained 1% on resin solids of a commercial additive according to U.S. Pat. No. 3,203,820, micronised; Control E contained no additive).

| Additive Blend No. | Condition of film on Hegmann drawdown after heating to | | | |
|---|---|---|---|---|
| | Room temp. 20–22° C (no heating) | 40° C | 80° C | 120° C |
| 2 | Smooth | Smooth | Smooth | Smooth |
| Control D | Smooth | Smooth | Seedy | Seedy |
| Control E (no additive) | Smooth | Smooth | Smooth | Smooth |

In the stoving test using the drilled steel panels, film thicknesses measured just below a 1 cm sag were
Blend No. 2 80 microns
Control D 65 microns
Control E 50 microns
The action of the additive of the invention and its superiority over the products of the prior art is thus clearly demonstrated.

EXAMPLES 16

A thermosetting hydroxy acrylic coating composition is prepared from titanium dioxide ("Runa" RH 472) a hydroxy acrylic resin ("Synocryl 823S) and a butylated melamine formaldehyde resin (Beetle BE 615). The solids ratio of acrylic polymer to melamine resins is 4:1 and the pigment binder ratio is 0.8:1.0. The paint is made up following the procedure outlined above for the plasticising alkyd resin composition but using a 3:1 by weight xylol/butanol solvent blend as thinner. The flow control additive (blend 2) is added as a 15% dispersion in xylol. (1% by weight of the additive based on the total solid resin content of the paint). Using the improved test described above the following results are obtained.

| | film thickness below a 1 cm sag |
|---|---|
| Hydroxy acrylic paint with no flow control additive | 45–50μ |
| Hydroxy acrylic paint with flow control additive | 80–85μ |

EXAMPLE 17

A high build chlorinated rubber finish was prepared according to the following formulation:

| | |
|---|---|
| Titanium dioxide (Runa RH 472) | 12.6 |

-continued

| | |
|---|---|
| Blanc Fixe | 12.6 |
| Chlorinated paraffin plasticiser (Cereclor 42) | 6.1 |
| Chlorinated paraffin plasticiser (Cereclor 70) | 12.2 |
| Chlorinated rubber (Alloprene R10) | 18.4 |
| Xylol | 28.8 |
| 15% Dispersion of flow control additive (Blend No. 2) in xylol | 9.3 |

The paint was prepared by high speed stirring in the course of which the temperature rose to 55° C. This formulation was compared with two others
(i) having the level of flow control additive
(ii) omitting the flow control additive applying the coatings by brush to abraded steel panels at film thicknesses of 4 thou. The panels were then stored vertically. Sagging was assessed visually; the coating containing no additive sagges badly at both 4 thou and 10 thou film thickness; the remaining films showed no visual evidence of sagging at either film thickness.

EXAMPLE 18

Two laminating compositions were prepared from a commercially available unsaturated polyester composition (Synolac 6345) comprising 67% of an unsaturated polyester resin.

In the first composition 0.5 parts by weight of a flow control additive (Blend No. 2) was milled in 10 parts by weight of the unsaturated polyester solution by high speed dispersion. During the course of this mixing the temperature rose to 40/45° C. This paste was then let down with 90 parts by weight of unsaturated polyester solution.

A second composition was an unmodified aliquot of the unsaturated polyester solution.

The viscosity of these two compositions was measured on a Brookfield Viscometer model RVT using a number 2 spindle, at 25° C.

| | Sample with additive | Sample without additive |
|---|---|---|
| Viscosity (spindle speed 5 rpm) | 9.2p | 4.0p |
| Viscosity (spindle speed 5 rpm) | 4.2p | 4.05p |
| Thixotropic index $\frac{\text{(viscosity at 5 rpm)}}{\text{(viscosity at 50 rpm)}}$ | 2.19 | 0.99 |

The behaviour of these two compositions was exemplified in a laminate of two layers of 1.5oz ft$^{-2}$ at a reson to glass ratio of 2.5:1. The sample with additive showed only slight signs of drainage in areas where resin excess at the surface; the sample without additive exhibited severe drainage under similar conditions.

We claim:
1. A rheological control agent comprising a particulate blend of hydrogenated castor oil and an oligomeric polyamide derived from hdroxystearic acid, at least one saturated aliphatic α-omega diprimary diamine containing 2, 4, 6, 8 or 10 carbon atoms and at least one saturated aliphatic α-omega dicarboxylic acid containing from 2 to 12 carbon atoms and/or hydrogenated dimer acid, said oligomeric polyamide being derived from the reaction of said hydroxystearic acid, dicarboxylic acid and a diamine in such proportions that for each mole of hydroxystearic acid there are present 0.05 - 0.5 moles of dicarboxylic acid and a quantity of diamine sufficient to provide of from 0.8 to 1.15 amine groups for each carboxyl group in the acid mixture where in the weight ratio of hydrogenated castor oil to oligomeric amide is from 9:1 to 1:9.

2. A rheological control agent as claimed in claim 1 in which the dicarboxylic acid contains 2, 4, 6, 8 or 12 carbon atoms.

3. A rheological control agent as claimed in claim 1 in which the quantity of diamine is sufficient to provide from 0.95 to 1.05 amine groups for each carboxyl group in the acid mixture.

4. A rheological control agent as claimed in claim 1 in which the hydroxystearic acid is one produced by the hydrolysis of hydrogenated castor oil.

5. A rheological control agent as claimed in claim 1 in which the weight ratio of hydrogenated castor oil to oligomeric amide is from 4:1 to 1:4.

6. A dispersion of a rheological control agent in an organic medium, said rheological control agent comprising a particulate blend of hydrogenated castor oil and an oligomeric polyamide derived from hydroxystearic acid, at least one saturated aliphatic α -omega diprimary diamine containing 2, 4, 6, 8 or 10 carbon atoms and at least one saturated aliphatic α -omega dicarboxylic acid containing from 2 to 12 carbon atoms and/or hydrogenated dimer acid, said oligomeric polyamide being derived from the reaction of said hydroxystearic acid, dicarboxylic acid and diamine in such proportions that for each mole of hydroxystearic acid there are present 0.05 - 0.5 moles of dicarboxylic acid and a quantity of diamine sufficient to provide of from 0.8 to 1.15 amine groups for each carboxyl group in the acid mixture where in the weight ratio of hydrogenated castor oil to oligomeric amide is from 9:1 to 1:9.

7. A dispersion as claimed in claim 6 in which the organic medium is an aliphatic or aromatic hydrocarbon.

8. A dispersion as claimed in claim 6 containing about 15% w/w of rheological control agent.

9. A surface coating composition comprising an organic binder and having dispersed therein a rheological control agent comprising a particulate blend of hydrogenated castor oil and an oligomeric polyamide derived from hydroxystearic acid, at least one saturated aliphatic α -omega diprimary diamine containing 2, 4, 6, 8 or 10 carbon atoms and at least one saturated aliphatic α -omega dicarboxylic acid containing from 2 to 12 carbon atoms and/or hydrogenated dimer acid, said oligomeric polyamide being derived from the reaction of said hydroxystearic acid, dicarboxylic acid and diamine in such proportions that for each mole of hydroxystearic acid there are present 0.05-0.5 moles of dicarboxylic acid and a quantity of diamine sufficient to provide of from 0.8 to 1.15 amine groups for each carboxyl group in the acid mixture where in the weight ratio of hydrogenated castor oil to oligomeric amide is from 9:1 to 1:9.

10. A paint as claimed in claim 9 containing about 0.5% of rheological control agent.

11. The control agent of claim 1 wherein the particulate blend has an average particle size of less than 25 microns.

12. The dispersion of claim 6 wherein the particulate blend has an average particle size of less than 25 microns.

13. The composition of claim 9 wherein the weight ratio of hydrogenated castor oil to oligomeric amide is from 9:1 to 1:9.

14. The composition of claim 13 wherein the particulate blend has an average particle size of less than 25 microns.

15. The composition of claim 14 wherein the surface coating composition is a paint.

16. The composition of claim 15 wherein the organic binder comprises an alkyd resin.

17. The composition of claim 14 wherein the organic binder is comprised of a resin.

18. The composition of claim 17 wherein the resin is dissolved in a solvent.

* * * * *